United States Patent [19]

MacDonald et al.

[11] Patent Number: 4,515,818
[45] Date of Patent: May 7, 1985

[54] PROCESS FOR PREPARING SUNFLOWER BUTTER SPREAD FROM PRETREATED SUNFLOWER SEEDS

[75] Inventors: Bruce E. MacDonald; Geoffrey Galloway, both of Saskatoon; Yukio Kakuda, Guelph, all of Canada

[73] Assignee: CSP Foods Ltd., Saskatoon, Canada

[21] Appl. No.: 354,378

[22] Filed: Mar. 3, 1982

[51] Int. Cl.³ ............................ A23L 1/20; A23L 1/36
[52] U.S. Cl. .................................... 426/268; 426/629; 426/633
[58] Field of Search ........ 426/629, 632, 633, 255–261, 426/268

[56] References Cited

U.S. PATENT DOCUMENTS

| | | | |
|---|---|---|---|
| 1,848,806 | 3/1932 | Seyer | 426/629 |
| 2,025,705 | 12/1935 | Bienenstock et al. | 426/629 X |
| 2,911,303 | 11/1959 | Rowland et al. | 426/633 |
| 3,622,556 | 11/1971 | O'Connor | 426/632 X |
| 3,671,267 | 6/1972 | Gooding et al. | 426/633 |
| 3,821,448 | 6/1974 | Parker et al. | 426/633 X |
| 4,004,037 | 1/1977 | Connick | 426/633 X |
| 4,072,671 | 2/1978 | Sodini et al. | 426/629 X |
| 4,212,799 | 7/1980 | Nuzzolo et al. | 426/656 X |

FOREIGN PATENT DOCUMENTS 386167 1/1933 United Kingdom ................ 426/629

OTHER PUBLICATIONS

Furia, T. E., "CRC Handbook of Food Additives", vol. I, CRC Press Inc., Cleveland, Ohio, 1968, pp. 91, 241, 242.
Grant, J., "Hackh's Chemical Dictionary", McGraw-Hill Book Co., N.Y. 1969, p. 575.

Primary Examiner—Robert Yoncoskie
Attorney, Agent, or Firm—Stanley G. Ade

[57] ABSTRACT

There is disclosed a method of preparing sunflower butter from dehulled sunflower seeds by treating said seeds with a solution of any one of ascorbic acid, erythorbic acid, hydroquinone, formaldehyde, ascorbyl palmitate or tartaric acid. The treatment avoids discoloration of the sunflower butter prepared from said treated sunflower seeds.

9 Claims, 2 Drawing Figures

Enzyme-catalyzed oxidation of caffeic acid to caffeoquinone followed by autolytic bonding to amino and thiol groups in protein.

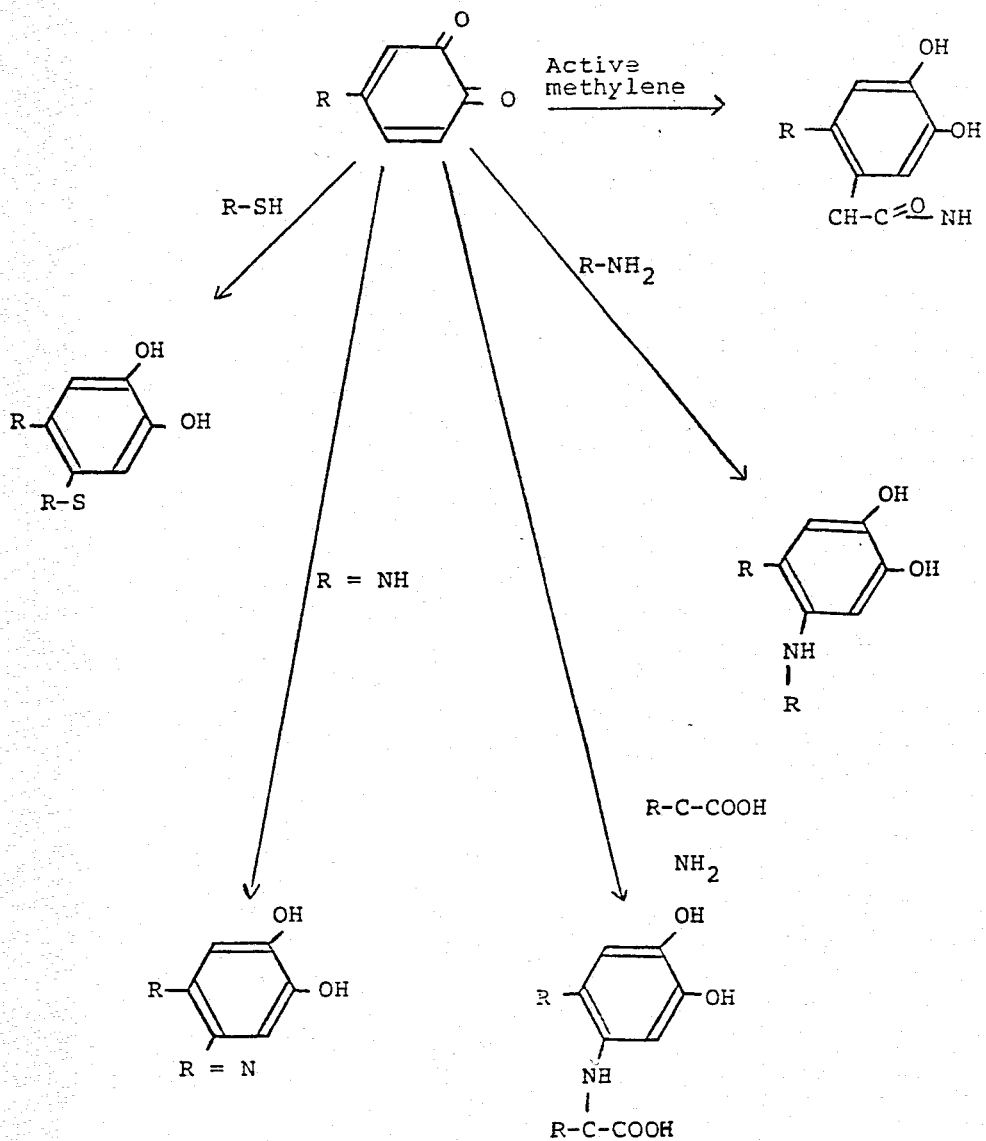
Fig. 2. Reactions of o-quinone with sulfhydryl, amino, imino and activated methylene groups under alkaline conditions.

PROCESS FOR PREPARING SUNFLOWER BUTTER SPREAD FROM PRETREATED SUNFLOWER SEEDS

BACKGROUND OF THE INVENTION

This invention relates to a sunflower butter or spread and a pretreatment process of the sunflower kernels, meat, meal or products thereof. These products are superior in quality to conventional peanut butter or peanut spreads and may be processed to achieve a smooth and creamy texture, a regular style, or a chunky or crunchy style. In the specification and claims, the term "sunflower seeds" includes sunflower kernels, pearled kernels, cut kernels, meal and the like.

CONVENTIONAL PEANUT BUTTER CHARACTERISTICS

Conventional peanut butter is processed by roasting and blanching raw, whole and/or split peanuts followed by milling and/or grinding and/or homogenization to achieve a homogenous mixture. The resulting product may have added thereto, salt, sweetening agents and stabilizers which generally improve the quality characteristics and sensory attributes of the finished product. Stabilizers usually consist of high melting point fat components which are added during the grinding stage or when the product is held at an elevated temperature. Several patents outline procedures for stabilizing peanut butter and related products (U.S. Pat. Nos. 3,129,102; 3,671,267). A process has also been described whereby peanuts are ground in the presence of solid carbon dioxide to improve the flavour and increase the shelf life of the finished product (U.S. Pat. No. 4,004,037). This process reduces the amount of oxygen which is dissolved, occluded and absorbed from the ingredients.

Once the peanut butter has been homogenized, it is subjected to deaeration and chilling processes which remove occluded air and produce a crystal matrix, respectively, in the finished product.

PROCESSING CONDITIONS

Some of the current processing technology for manufacturing conventional peanut butter and products thereof can be utilized in developing confectionery Sunflower butter. Initially, the manufacturing procedure for Sunflower butter appears to be relatively simple, consisting of roasting the Sunflower seeds, grinding and/or milling and/or homogenizing the mixture of ingredients, followed by deaeration, cooling and filling the product into containers. However, there are complex chemical and physical changes which arise during the processing of Sunflower butter which do not occur in the processing of peanut butter and which ultimately affect the quality of the finished product. It is imperative that the quality of incoming raw materials be both consistent and of high standards. The selection of optimum processing equipment, operating parameters, type and quantity of raw ingredients, and tempering conditions is essential to maintain a consistent, uniform, high quality product.

The basic processing steps include:

1. Pretreatment

Pretreatment of the Sunflower kernels, meat, meal or the like to remove the greyish-green discoloration which is normally present therein due to the presence and subsequent reactions of chlorogenic and/or caffeic and other phenolic compounds. This pretreatment will be described hereinafter.

2. Roasting

Roasting is one of the primary steps in Sunflower butter production whereby the Sunflower seeds are subject to radiant heat to roast or toast them to a uniform colour and pleasant flavour. This process may consist of a belt moving continuously through a series of oven compartments which gradually raise the temperature of the seeds to approximately 160° C. Typical residence times are from 10 to 40 minutes. Proctor and Schwartz make a suitable belt roaster. Sunflower seeds may also be roasted in a batch-type of operation such as that manufactured by W. C. Cantrell Co. of Ft. Worth, Tex. Production rates are three to four batches per hour with a stock capacity of 1000 to 1200 lbs. per hour, depending on the desired colour of the finished product and size of roaster.

The time/temperature relationship is an important parameter during roasting and influences several quality characteristics, namely:

(a) development of optimum colour.
(b) development of desirable flavour.

The roasting process for Sunflower butter involves strict quality control measures to ensure that the product is not subjected to over-roasting conditions. Since confectionery Sunflower seeds are smaller in size than most varieties of peanuts, more care must be taken in selecting precise conditions to attain a well-balanced flavour and optimum colour.

On completion of roasting, it is essential that the Sunflower seeds are cooled as quickly as possible to prevent further roasting or darkening of the product. Again, the seeds may pass through a cooling chamber on a continuous belt or be cooled in a bin by passing cold air through the product.

It is important to note that fresh roasted Sunflower seeds have a volatile and perishable flavour. Therefore, they should be processed as quickly as possible to obtain a high quality product. Holding roasted seeds for several hours prior to grinding can result in "stale" Sunflower butter flavour.

Flavour as related to a Sunflower butter type of product is a complex sensation involving both taste and aroma. It is, therefore, imperative that the finished product flavour be well-balanced. The flavour is a pleasant sensation consisting of:

(a) roasted Sunflower seeds and/or peanuts,
(b) sweetness,
(c) saltiness.

On the other hand, flavours may develop during processing which render the product unacceptable in terms of quality, namely:

(a) bitterness due to over-roasting,
(b) "green" flavour due to inadequate roasting,
(c) burnt flavour due to over-roasting,
(d) rancid flavour due to lipid oxidation,
(e) oily flavour due to the inability of the mixture to hold the oil.

Process conditions should be selected to avoid these flavour defects.

3. Milling/Grinding/Homogenization

This is one of the most important stages in processing Sunflower butter and relates directly to the quality of the finished product. There are generally three types of processing methods which can be used singly or in combination: milling, grinding or homogenization—all of which can produce a quality product with uniform consistency. Crucial to the selection of an appropriate process is the precise metering of incoming ingredients and control of operating parameters such as product temperature and distance between grinding plates. W. C. Cantrell Co. offers a Vibra Screw SCR-20 Feeder for the accurate metering of dry ingredients. Such feeders will ensure a uniform consistency in the finished product.

(a) Milling

The milling process generally consists of linking two attrition mills in series, the first providing a coarse grind and the second a fine grind. For fine grinding, clearance between the plates or discs usually range from 0.003 to 0.032 inches. These mills can be used with a single pass to produce medium or coarse grades of Sunflower butter.

Maximum temperatures during milling or grinding should not exceed 82° C. to prevent "burnt" flavours in the finished product. In some instances cooling equipment may be inserted between two mills to keep product temperatures to a minimum. Cryogenic milling with solid carbon dioxide may also be used to improve product stability by reducing the amount of oxygen incorporated during milling.

(b) Grinding

Grinding or size reduction may also be utilized in the processing stages and is usually installed as a two-stage process. Product is fed into a pre-breaker/grinder and then fed to a size reduction unit to give a smooth, creamy product.

Urschel manufacturers Comitrol equipment for this process with separate cutting heads for each operation.

The size of the finished particle is determined by the opening between the cutting blades and depth of cut made by the blades. The microcut head may vary from 156 to 210 blades, depending on the desired finished product consistency, and remains stationary. A high speed impellor (6,000–12000 rpm) forces the prebroken seeds against the blades to produce a smooth consistency. The leading edge of the blade is a sharp knife which accomplishes size reduction with no metal-to-metal contact.

(c) Homogenization

Homogenization may be used as a unit process or as a finishing process for manufacturing Sunflower butter and products thereof. This process produces a fine and creamy texture as well as a smooth appearance.

4. Deaeration

The previous grinding or milling procedures incorporate air into the butter which would subsequently decrease the shelf life of the product if not removed. Thus, stainless steel deaeration tanks may be employed to facilitate the release of entrained air from the butter. A full sweep agitator removes the product from the wall of the vessel and continuously exposes new surface to allow air to escape under vacuum.

5. Chilling

Chilling is an important aspect of the Sunflower butter processing and is required to reduce product temperatures down to approximately 32°–43° C. for filling. The outlet temperature will depend on the choice of stabilizer, but should be as low as tolerable for filling so that the dissipation of heat during tempering is kept to a minimum. The common equipment used in this type of operation are either Votator "C" units or Crepaco Swept Surface Heat Exchangers.

Optimum operating parameters must be selected to promote crystallization and achieve a desirable finished product texture. In addition, operating conditions should be related to tempering conditions to maximize product quality.

6. Tempering

Finished product is tempered for a period of up to 72 hours at 10°–38° C. in order to optimize crystallization properties of the product.

7. Chunk Style

In the preparation of a chunk style Sunflower butter and products thereof, granulated Sunflower seeds or other suitable nuts are mixed into a smooth or creamy phase prior to the packaging process. Unfortunately, the agitation or mixing required to obtain an even distribution of chunks in the butter phase produces an end product which exhibits a greater tendency to oil out. This is a result of marked disruption of the continuous fat structure in the Sunflower butter. Oil separation will generally occur in the vicinity of a Sunflower chunk. Higher levels of chunks will accentuate the problem and produce a Sunflower butter which is difficult to spread. Therefore, many peanut butter manufacturers will increase the level of hard fat or stabilizer in the smooth phase to compensate for the oil separation problem. Similarly, increased levels of stabilizer are employed in Sunflower butter to improve spreadability and maintain protection against oil separation. Additional levels of 0.5% to 3.5% hard fat, monoglycerides, diglycerides, or blends thereof are commonly utilized.

Quality Characteristics:

Quality characteristics as they relate to confectionery Sunflower butter are both numerous and diverse in nature. They vary according to ingredients, formulation, method of manufacture, and tempering and handling conditions.

The end result is a product category having a wide range of quality attributes.

Examples of product composition are shown as follows:

EXAMPLE 1

90% Sunflower Seeds
2% Vegetable Oil
2% Hydrogenated Vegetable Oil
4.5% Sugar (dextrose)
1.5% Salt

EXAMPLE 2

90% Sunflower Seeds
2% Mono and Diglycerides
2% Hydrogenated Vegetable Oil
4.5% Sugar (dextrose and icing sugar)
1.5% Salt

EXAMPLE 3

80% Sunflower Seeds
8.5% Vegetable Oil
2% Mono and Diglycerides
4% Hydrogenated Vegetable Oil
4% Sugar (dextrose)
1.5% Salt A nutritional profile compares two commercial brands of smooth style peanut butter against the Sunflower butter outlined in Table 1. Results are shown in Table 6 and indicate similar values for proximate analyses. The Sunflower butter had a slightly lower moisture level and higher ash and fibre content than peanut butter. Protein contents were similar and ultimately depend on the level of nuts or seeds in the formula. The concentration of fat, on the other hand, depends both on the level of nuts or seeds and the level of added fat or stabilizer.

Mineral contents in the two brands of peanut butter were similar while the Sunflower butter showed slightly higher levels, especially in calcium and phosphorus.

Salt is added to peanut butter for palatability considerations and was found to vary from 1.27% in Brand #1 peanut butter to 1.51% in Brand #2 peanut butter.

Acidity or pH ranged from 6.65 to 6.70 in peanut butter to 6.25 in the Sunflower butter. These differences would not be expected to significantly influence shelf life or product quality.

TABLE 1

Nutritional profile of peanut butter versus Sunflower butter.

| DESCRIPTION | COMPOSITION BY WEIGHT | | |
|---|---|---|---|
| | BRAND #1 % | BRAND #2 % | SUNFLOWER BUTTER % |
| Proximate Analysis: | | | |
| Moisture | 1.26 | 2.65 | 0.50 |
| Fat | 53.30 | 52.10 | 54.30 |
| Protein (N × 5.46) | 22.80 | 21.58 | 21.58 |
| Ash | 3.11 | 3.38 | 4.74 |
| Fibre | 1.28 | 1.44 | 1.92 |
| Carbohydrate by Difference | 18.25 | 18.85 | 16.96 |
| Total Sugars | 7.25 | 10.48 | 8.12 |
| Viscosity, cps: | | | |
| 2 rpm | $2.72 \times 10^6$ | $2.00 \times 10^6$ | $3.25 \times 10^6$ |
| 4 rpm | $1.61 \times 10^6$ | $1.03 \times 10^6$ | $1.83 \times 10^6$ |
| pH | 6.70 | 6.65 | 6.25 |
| Salt (by Cl) | 1.27 | 1.51 | 1.47 |
| (by Na) | 1.28 | 1.42 | 1.28 |
| Calcium | 0.052 | 0.043 | 0.072 |
| Phosphorus | 0.35 | 0.33 | 0.74 |
| Potassium | 0.58 | 0.57 | 0.63 |
| Iron | 0.0050 | 0.0040 | 0.0055 |
| Fatty Acid Profile: | g/100 g fat | | |
| $C_{16:0}$ | 9.9 | 9.0 | 5.9 |
| $C_{18:0}$ | 4.0 | 4.2 | 6.6 |
| $C_{18:1}$ | 45.6 | 44.3 | 15.9 |
| $C_{18:2}$ | 35.3 | 34.7 | 70.0 |
| $C_{18:3}$ | 1.4 | 1.3 | — |
| $C_{20:0}$ | 0.8 | 1.8 | — |
| $C_{22:0}$ | 3.0 | 4.7 | 1.6 |
| Polyunsaturates (P) | 36.7 | 36.0 | 70.0 |
| Saturates (S) | 17.7 | 19.7 | 14.1 |
| P/S | 2.1:1 | 1.8:1 | 5.0:1 |

From a nutritional point of view, fatty acid profiles have become increasingly important in the past few years. Indeed, levels of polyunsaturated and saturated fat in the diet have been of interest to dietitians, physicians, the fats and oils industry, government, and of course the consumer at large.

The nutritional profile indicates that the polyunsaturated fatty acid content of the Sunflower butter is approximately twice that in peanut butter. Polyunsaturates ranged from 36.0% to 36.7% in peanut butter to 70% in the Sunflower butter. Another important aspect to note is that the polyunsaturate/saturate ratio is 5.0:1 in the Sunflower product compared to 1.8 to 2.1:1 in the peanut butter samples. These results are depicted as typical for these types of products. The Sunflower spreads are characteristically greater than 55% in fat content with similar fatty acid profiles.

With reference to the pretreatment process mentioned previously, a process is disclosed which eliminates the greyish-green discoloration which is normally present in Sunflower kernels, meat, meal or products thereof and results from the presence and subsequent reactions of chlorogenic acid and/or caffeic acid. This pretreatment process utilizes chemical treatments to eliminate the colour problems.

FIG. 2 shows the reactions of o-quinone with sulfhydryl, amino, imino and activated methylene groups under alkaline conditions.

PHENOLIC COMPOUNDS

Figure 1:
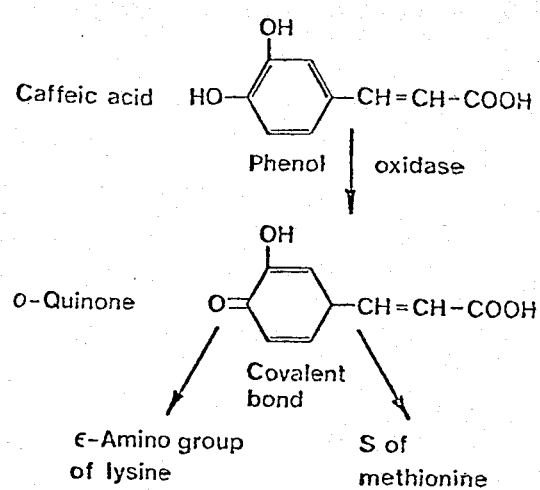
FIG. 1 shows a suggested reaction for the formation of colour complexes in Sunflower products.

The successful utilization of Sunflower kernels, meal or flour for human consumption such as Sunflower butter, spread and products thereof, has been hampered by the detrimental properties of phenolic compounds present in these materials. These compounds produce an objectionable dark greyish-green colour due to the oxidation of polyphenolic compounds. Chlorogenic acid has been identified as the major polyphenolic compound in Sunflower kernels with minor constituents comprising caffeic acid, 3,5-dicaffeoylquinic acid, and a disubstituted cinnamic acid.

The exact mechanism responsible for producing the discolouration problem is not well defined in the literature. Sosulski proposed the following reaction to account for the formation of colour complexes in Sunflower products (FIG. 1). Atmospheric oxygen or enzyme catalyzed oxidation results in the formation of quinoidal compounds and possibly hydroperoxides. Both of these substances destroy labile amino acids, denature proteins and inhibit enzymes such as indole acetic acid oxidase, trypsin and lipase, and arginase. Cinnamic acids and their esters are of particular significance in oilseeds since they are preferred substrates for phenol oxidase.

The ortho-dihydroxyphenols such as caffeic acid, part of the chlorogenic acid molecule, may be oxidized to ortho-quinones by copper-containing enzymes present in the Sunflower material. Once formed, ortho-quinones such as chlorogenoquinone can react nonenzymatically to polymerize or may bond covalently to free amino, thiol or methylene groups of protein. The 3-amino group of lysine and the thioether group of methionine may be common targets, thereby rendering them nutritionally unavailable to the monogastric digestive system. The end result is a product with non-aesthetic properties.

FIG. 1 shows a possible reaction scheme for the discoloration of sunflower products. FIG. 2 depicts a series of reactions of o—quinone with sulfhydryl, amino, imino and activated methylene groups under alkaline conditions. The initial addition products are in their reduced (hydroquinone) state and are not brightly coloured. For example, the reaction of o—quinone with an amino acid forms the addition product and the concomitant reduction of quinone to the hydroquinone.

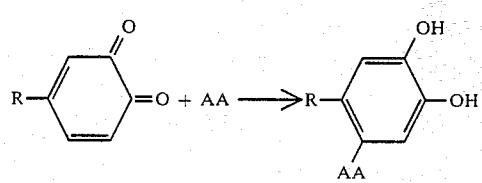

In the reduced state the addition product is not colored green. However, when the reduced form is oxidized by an unreacted quinone or oxygen, the dark green color develops.

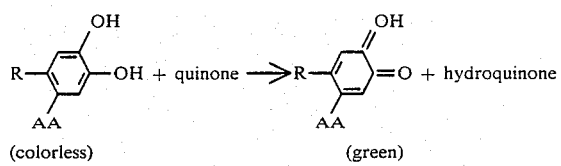

(colorless)     (green)

As a result of the discolouration problem, numerous investigators have attempted to remove the phenolic compounds from the kernels, meal or subsequent products. Complete removal of phenolics from Sunflower meal or isolate has been demonstrated after long periods of refluxing or shaking with 50-95% ethanol or 70-85% methanol. Aqueous batch diffusion has removed over 90% of the chlorogenic acid from dehulled kernels and the defatted flour retained its white appearance under alkaline conditions. This process was based on the principle that low molecular weight substances such as polyphenolic acids, simple sugars, minerals and nonprotein nitrogen compounds will passively diffuse through the semipermeable membrances in the plant cells while large molecules such as triglycerides, protein, starch and crude fibre are retained in the kernel. However, operational costs for this method ae prohibitive due to long extraction periods, large volumes of water required and high temperatures required.

SUMMARY OF THE INVENTION

The present invention relates to a chemical and/or physical process which eliminates the discolouration problem in Sunflower kernels, meat, meal or products thereof. The source of Sunflowers may be either the confectionery or oilseed varieties and must be dehulled prior to application of the process. This process may be described as a pretreatment process, especially when it is applied to the whole Sunflower kernel after dehulling. Testas may or may not be removed prior to pretreatment processing. In any event, it is undertaken prior to the roasting of seeds.

As discussed, this invention may be applied to Sunflower meats or meal. These substances may or may not be ground up in conventional ways prior to treatment by the process described herein.

The basic invention details a process which uses a reducing agent. The end result of this process is the elimination of the grey-green colour and, in many instances, an improvement in the flavour and palatability of the product. Product yields may range above 90% and are typically in the range of 95%.

Reducing agents can serve two functions. They will be preferentially oxidized and thereby prevent the oxidation of caffeic and chlorogenic acids or if strong reducing agents are used, they can convert the orthoquinones back to the reduced state.

A. Organic reducing agents
 1. ascorbic acid
 2. erythorbic acid
 3. hydroquinone
 4. formaldehyde
 5. acscorbyl palmitate.

In the process for use of the reducing agents, the solution containing them should include the selected reducing agent in a ratio of between 0.05% and 5.0% by weight. The seeds or other form of meal and the like are soaked in the solution at a temperature of between 1° C. and 100° C. Cooking under pressure could utilize higher temperatures. For example, temperatures could reach 200° C. at 222.5 p.s.i.

It will of course be appreciated that the hotter the solution, the less time is required for the solution to be absorbed by the seeds until they contain approximately 40% by weight of the solution although this figure can go as high as 70% by weight.

The time is therefore between 24 hours if the solution is at 1° C. down to approximately 2 minutes if the solution is at the boiling point, namely, 100° C.

The preferred temperature is 95° C. and the preferred moisture content should be approximately 40% by weight.

Once this has been reached, the seeds or other form of meal, are placed in a combination drying and roasting device the temperature of which is preferably approximately 160° C. However, this temperature may vary from a low of 30° C. to a high of 240° C.

Drying ends when the moisture content has dropped to approximately 8% by weight and at that point the roasting action commences and takes approximately 2 to 40 minutes depending upon the roasting colour required. The desirable colour is a light toasted colour and once again this depends upon the temperature selected.

Once the roasting action has been completed, the remainder of the process as hereinbefore described, may take place with the roasting action preventing a reverse of the discolouration from occurring.

Examples of typical pretreatment systems are as follows:

Example 1

Dehulled confectionary Sunflower seed is immersed in a 2% solution of ascorbic acid at 30° C. until the seed moisture content has reached 40% by weight. The pretreated seed is then dried and roasted at 160° C.

Example 2

Dehulled confectionary Sunflower seed is immersed in a boiling solution of erythorbic acid (1% by weight) for 30 minutes. The pretreated seed is then dried and roasted at 160° C.

Example 3

Dehulled Sunflower seed is immersed in a 1% tartaric acid solution (by weight) at 95° C. for 20 minutes. The pretreated seed is then dried and roasted at 170° C.

We claim:

1. In a process for the preparation of sunflower butter from dehulled sunflower seeds which contain phenolic compounds producing discoloration thereof including forming butter from the seeds and deaerating, chilling and tempering the butter, the improvement comprising prior to the forming of the butter applying to the seeds a solution containing 0.05% to 5.0% by weight of a reducing agent selected from the group consisting of ascorbic acid, erythorbic acid, hydroquinone, formaldehyde and ascorbyl palmitate to the seeds at a temperature above 1° C. such that the seeds absorb between 40% and 70% by weight of the solution, following which prior to any reformation of the discoloration, drying the seeds and roasting at a temperature and time at least sufficient and up to 240° C. to produce a light brown color.

2. A process according to claim 1 wherein after drying and roasting the moisture content is of the order of 8% by weight.

3. A process according to claim 1 wherein the roasting temperature is 160° C.

4. The process according to claim 1 wherein the reducing agent is ascorbic acid.

5. The process according to claim 1 wherein the reducing agent is erythorbic acid.

6. The process according to claim 1 wherein the reducing agent is hydroquinone.

7. The process according to claim 1 wherein the reducing agent is formaldehyde.

8. The process according to claim 1 wherein the reducing agent is ascorbyl palmitate.

9. In a process for the preparation of sunflower butter from dehulled sunflower seeds which contain phenolic compounds producing discoloration thereof including forming butter from the seeds and deaerating, chilling and tempering the butter the improvement comprising prior to the forming of the butter applying to the seeds a solution containing 0.05% to 5.0% by weight of tartaric acid at a temperature above 1° C. such that the seeds absorb between 40% and 70% by weight of the solution, following which prior to any reformation of the discoloration, drying said seeds and roasting at a temperature and time at least sufficient and up to 240° C. to produce a light brown color.

* * * * *